(12) United States Patent
Gorodetsky et al.

(10) Patent No.: US 12,132,649 B2
(45) Date of Patent: Oct. 29, 2024

(54) SYSTEM AND METHOD FOR FACILITATING EFFICIENT HOST MEMORY ACCESS FROM A NETWORK INTERFACE CONTROLLER (NIC)

(71) Applicant: Hewlett Packard Enterprise Development LP, Spring, TX (US)

(72) Inventors: Igor Gorodetsky, Coquitlam (CA); Hess M. Hodge, Seattle, WA (US); Timothy J. Johnson, Sun Prairie, WI (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/454,202

(22) Filed: Aug. 23, 2023

(65) Prior Publication Data

US 2023/0403229 A1   Dec. 14, 2023

Related U.S. Application Data

(63) Continuation of application No. 17/594,647, filed as application No. PCT/US2020/024258 on Mar. 23, 2020, now Pat. No. 11,757,763.

(Continued)

(51) Int. Cl.
*G06F 13/24*   (2006.01)
*G06F 9/50*   (2006.01)
(Continued)

(52) U.S. Cl.
CPC ............ *H04L 45/28* (2013.01); *G06F 9/505* (2013.01); *G06F 9/546* (2013.01);
(Continued)

(58) Field of Classification Search
CPC ...... G06F 12/0862; G06F 13/14; G06F 13/16; G06F 13/1642; G06F 13/1673;
(Continued)

(56) References Cited

U.S. PATENT DOCUMENTS 9,906,443 B1 *   2/2018   Singh ................. H04L 49/3063
2007/0053349 A1 *   3/2007   Rittmeyer ........... H04L 49/9047
370/378

(Continued)

*Primary Examiner* — Henry Tsai
*Assistant Examiner* — Kim T Huynh
(74) *Attorney, Agent, or Firm* — Yao Legal Services, Inc.

(57) ABSTRACT

A network interface controller (NIC) capable of efficient memory access is provided. The NIC can be equipped with an operation logic block, a signaling logic block, and a tracking logic block. The operation logic block can maintain an operation group associated with packets requesting an operation on a memory segment of a host device of the NIC. The signaling logic block can determine whether a packet associated with the operation group has arrived at or departed from the NIC. Furthermore, the tracking logic block can determine that a request for releasing the memory segment has been issued. The tracking logic block can then determine whether at least one packet associated with the operation group is under processing in the NIC. If no packet associated with the operation group is under processing in the NIC, tracking logic block can notify the host device that the memory segment can be released.

20 Claims, 8 Drawing Sheets

Related U.S. Application Data

(60) Provisional application No. 62/852,273, filed on May 23, 2019, provisional application No. 62/852,203, filed on May 23, 2019, provisional application No. 62/852,289, filed on May 23, 2019.

(51) Int. Cl.
| | |
|---|---|
| *G06F 9/54* | (2006.01) |
| *G06F 12/0862* | (2016.01) |
| *G06F 12/1036* | (2016.01) |
| *G06F 12/1045* | (2016.01) |
| *G06F 13/14* | (2006.01) |
| *G06F 13/16* | (2006.01) |
| *G06F 13/38* | (2006.01) |
| *G06F 13/40* | (2006.01) |
| *G06F 13/42* | (2006.01) |
| *G06F 15/173* | (2006.01) |
| *H04L 1/00* | (2006.01) |
| *H04L 43/0876* | (2022.01) |
| *H04L 43/10* | (2022.01) |
| *H04L 45/00* | (2022.01) |
| *H04L 45/021* | (2022.01) |
| *H04L 45/028* | (2022.01) |
| *H04L 45/12* | (2022.01) |
| *H04L 45/122* | (2022.01) |
| *H04L 45/125* | (2022.01) |
| *H04L 45/16* | (2022.01) |
| *H04L 45/24* | (2022.01) |
| *H04L 45/28* | (2022.01) |
| *H04L 45/42* | (2022.01) |
| *H04L 45/745* | (2022.01) |
| *H04L 45/7453* | (2022.01) |
| *H04L 47/10* | (2022.01) |
| *H04L 47/11* | (2022.01) |
| *H04L 47/12* | (2022.01) |
| *H04L 47/122* | (2022.01) |
| *H04L 47/20* | (2022.01) |
| *H04L 47/22* | (2022.01) |
| *H04L 47/24* | (2022.01) |
| *H04L 47/2441* | (2022.01) |
| *H04L 47/2466* | (2022.01) |
| *H04L 47/2483* | (2022.01) |
| *H04L 47/30* | (2022.01) |
| *H04L 47/32* | (2022.01) |
| *H04L 47/34* | (2022.01) |
| *H04L 47/52* | (2022.01) |
| *H04L 47/62* | (2022.01) |
| *H04L 47/625* | (2022.01) |
| *H04L 47/6275* | (2022.01) |
| *H04L 47/629* | (2022.01) |
| *H04L 47/76* | (2022.01) |
| *H04L 47/762* | (2022.01) |
| *H04L 47/78* | (2022.01) |
| *H04L 47/80* | (2022.01) |
| *H04L 49/00* | (2022.01) |
| *H04L 49/101* | (2022.01) |
| *H04L 49/15* | (2022.01) |
| *H04L 49/90* | (2022.01) |
| *H04L 49/9005* | (2022.01) |
| *H04L 49/9047* | (2022.01) |
| *H04L 67/1097* | (2022.01) |
| *H04L 69/22* | (2022.01) |
| *H04L 69/40* | (2022.01) |
| *H04L 69/28* | (2022.01) |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1642* (2013.01); *G06F 13/1673* (2013.01); *G06F 13/1689* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 45/7453* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 2212/50* (2013.01); *G06F 2213/0026* (2013.01); *G06F 2213/3808* (2013.01); *H04L 69/28* (2013.01)

(58) Field of Classification Search
CPC ............ G06F 13/4022; G06F 13/4221; G06F 15/17331; G06F 2213/0026; H04L 45/38; H04L 45/70; H04L 69/28
See application file for complete search history.

(56) References Cited

U.S. PATENT DOCUMENTS

| | | | |
|---|---|---|---|
| 2013/0163414 A1* | 6/2013 | Ichiki | H04L 41/0893 370/248 |
| 2013/0166859 A1* | 6/2013 | Rhoades | H04L 49/901 711/156 |
| 2020/0394066 A1* | 12/2020 | Senthil Nayakam | H04L 12/4625 |

* cited by examiner

SYSTEM AND METHOD FOR FACILITATING EFFICIENT HOST MEMORY ACCESS FROM A NETWORK INTERFACE CONTROLLER (NIC)

CROSS-REFERENCE TO RELATED APPLICATIONS

This application is a continuation of and claims the priority benefit of U.S. patent application Ser. No. 17/594,647, filed on Oct. 25, 2021, which is a 371 National Stage Entry of PCT/US2020/024258, filed on Mar. 23, 2020, which claims the benefit of and priority to U.S. Provisional Patent Application No. 62/852,203, filed on May 23, 2019, U.S. Provisional Patent Application No. 62/852,273, filed on May 23, 2019, and U.S. Provisional Patent Application No. 62/852,289, filed on May 23, 2019, the contents of which are incorporated herein by reference in their entirety

BACKGROUND

Field

This is generally related to the technical field of networking. More specifically, this disclosure is related to systems and methods for facilitating efficient host memory access from a network interface controller (NIC).

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of efficient host memory access is provided. The NIC can be equipped with an operation logic block, a signaling logic block, and a tracking logic block. The operation logic block can maintain a first operation group associated with packets requesting an operation on a memory segment of a host device of the NIC. The signaling logic block can determine whether a packet associated with the first operation group has arrived at or departed from the NIC. Furthermore, the tracking logic block can determine that a request for releasing the memory segment has been issued. The tracking logic block can then determine whether at least one packet associated with the first operation group is under processing in the NIC. If no packet associated with the first operation group is under processing in the NIC, tracking logic block can notify the host device that the memory segment can be released.

BRIEF DESCRIPTION OF THE FIGURES

In the figures, like reference numerals refer to the same figure elements.

DETAILED DESCRIPTION

Figure 1:
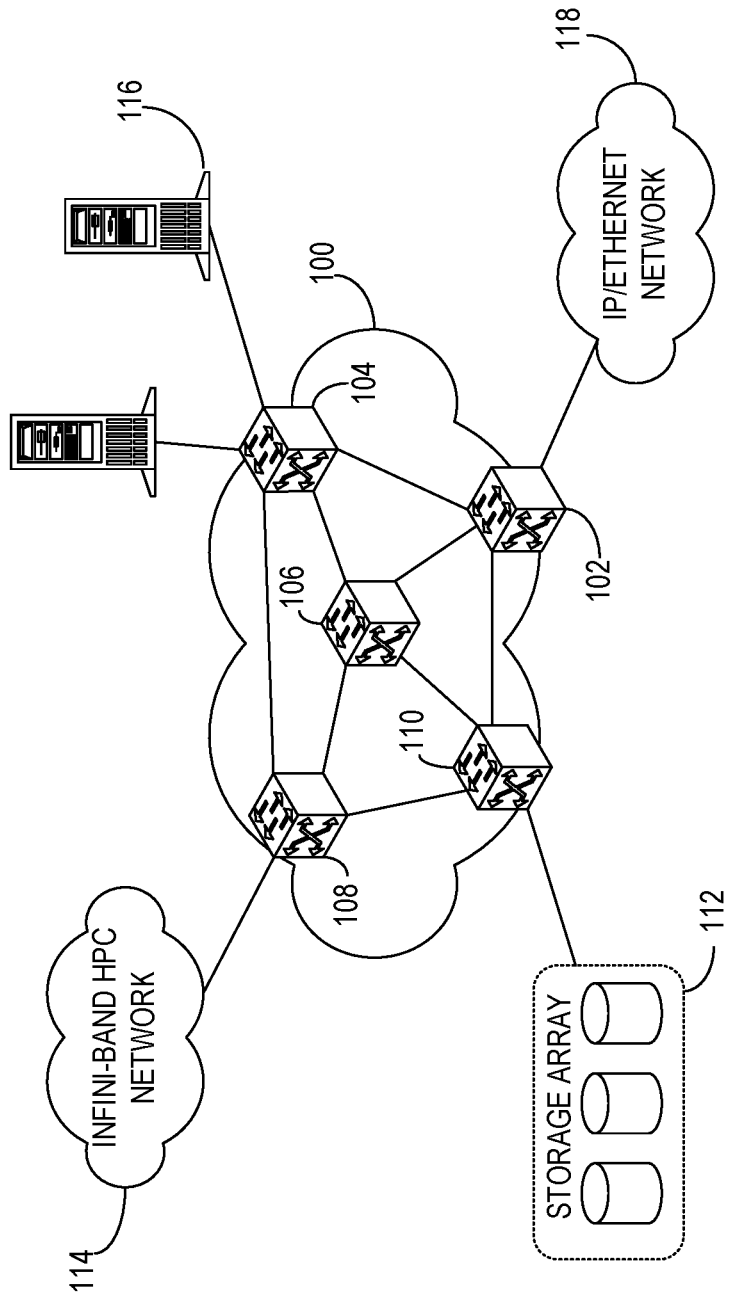
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate efficient host memory access from a network interface controller (NIC). The NIC allows a host to communicate with a data-driven network. The network can accommodate dynamic data traffic with fast, effective congestion control by maintaining state information of individual packet streams. More specifically, packets injected into the network of switches can be categorized into streams, which can be mapped to their layer-2, layer-3, or other protocol-specific header information. Each stream can be marked by a distinctive identifier that is local to an input port of a switch, and provided with a stream-specific input buffer so that each stream can be individually flow-controlled. In addition, packets of a respective stream can be acknowledged upon reaching the egress point of the network, and the acknowledgment packets can be sent back to the ingress point of the stream along the same data path in the reverse direction. As a result, each switch can obtain state information of active packet streams it is forwarding and can perform highly responsive, stream-specific flow control. Such flow control can allow the network to operate at higher capacity while providing versatile traffic-engineering capabilities.

The embodiments described herein solve the problem of efficiently processing late operation associated with memory access by (i) maintaining pending operation count of an operation group associated with a memory mapping, and (ii) allowing operations belonging to another operation group of a subsequent memory mapping to proceed when the pending operations are completed.

During operation, the NIC may process a command with an operation that can access the memory of the host device (e.g., a "GET" or a "PUT" command of remote direct memory access (RDMA)). A host interface of the NIC may couple the NIC with the host device and facilitate the communication between the memory of the host device and the NIC. If the command is an RDMA command, the process issuing the command may operate on a source device, and the host device receiving the command can be a target device. The NICs of the source and target devices can be referred to as the source and target NICs. The process may map a local memory address of the source device to a corresponding memory address, which can be virtual memory address, of the target device. This allows the process to issue commands that can directly perform operations in the memory of the target device.

Upon completion of its operations, the process may release the mapping. Consequently, the memory location associated with the memory address of the target device can be released (or freed) from the process and may be reallocated to another process. However, if the process is a distributed process, the operations issued from the process can be issued from different source devices. Consequently, memory release information can be distributed among different source devices. However, the release information may not be globally visible while the information is being distributed. As a result, some operations that access the released memory may still be issued from source devices that have not received the release information. These operations can be referred to late operations because of their late attempts to access the memory (e.g., a late read or write). A packet associated with a late operation can be referred to as a late packet. The late operations can be in the processing pipeline of the target device and may attempt to access the released memory.

To solve this problem, the target NIC can protect the memory from the late operations by flushing the processing pipeline of the target NIC. In some embodiments, the NIC can maintain two epochs. A respective epoch can represent an operation group, which can be associated with the packets with operations that can access the memory of the target device while the corresponding memory mapping may remain valid. The epoch can include a counter that indicates a number (or count) of the packets of the operation group. The epoch can be represented in the NIC based on an epoch identifier. For example, two epochs can be identified by a single bit in the NIC (e.g., using a single-bit register). When the memory mapping is registered at the target NIC, an epoch can be activated (e.g., by setting a corresponding value in a register). The corresponding epoch identifier is then distributed among the elements or units in the NIC.

When a packet enters the packet processing pipeline of the target NIC, the target NIC can tag the packet with the current epoch and subsequently, increment the counter of the current epoch. On the other hand, when the packet leaves the packet processing pipeline, the target NIC can decrement the counter of the epoch indicated in the packet. As a result, the counter can indicate the number of packets of the current epoch (i.e., the current operation group) that are in the packet processing pipeline of the target NIC. If the process issues a request to release the memory, upon obtaining the release information, the target NIC can switch (or toggle) the epochs. As a result, the epoch that has been associated with the released memory can become the previous epoch, and the new epoch can become the current epoch. The counter associated with the previous epoch can be referred to as the previous counter, and the counter associated with the current epoch can be referred to as the current counter.

All subsequent packets with memory access can then be tracked based on the current counter. However, the late packets, which are associated with the previous epoch and in the processing pipeline, can still be tracked based on the counter of the previous epoch. The target NIC can continue to decrement the previous counter when a late packet associated with the previous epoch leaves the processing pipeline. The memory may not be released until the previous counter becomes zero. This can allow the packets in the pipeline to complete their respective operations. When the previous counter becomes zero, the target NIC can determine that the late packets are flushed from the processing pipeline. The target NIC can then notify the target device that the memory can be released so that the operations associated with the current epoch can access the memory. Since the current counter has been incremented for the packets of these operations, the target NIC can decrement the current counter when a memory access operation is completed, and the associated packet can leave the processing pipeline.

One embodiment of the present invention provides a NIC that can be equipped with an operation logic block, a signaling logic block, and a tracking logic block. The operation logic block can maintain a first operation group associated with packets requesting an operation on a memory segment of a host device of the NIC. The signaling logic block can determine whether a packet associated with the first operation group has arrived at or departed from the NIC. Furthermore, the tracking logic block can determine that a request for releasing the memory segment has been issued. The tracking logic block can then determine whether at least one packet associated with the first operation group is under processing in the NIC. If no packet associated with the first operation group is under processing in the NIC, tracking logic block can notify the host device that the memory segment can be released.

In a variation on this embodiment, the tracking logic block can increment a first counter associated with the first operation group in response to a packet associated with the first operation group arriving at the NIC. On the other hand, the tracking logic block can decrement the first counter in response to a packet associated with the first operation group departing the NIC.

In a further variation, the tracking logic block can determine that no packet associated with the first operation group is under processing in the NIC based on the value of the first counter.

In a further variation, the signaling logic block can generate a signal to increment or decrement the first counter based on detecting an initiation or completion of an operation on the memory segment, respectively. The operation can be indicated in a packet of the first operation group.

In a further variation, the completion of the operation can include detecting an error for the operation.

In a variation on this embodiment, upon detecting a request for releasing the memory segment, the operation logic block can switch from a first operation group to a second operation group associated with packets requesting an operation on the memory segment after the release.

In a further variation, the tracking logic block can increment a second counter associated with the second operation group in response to a packet associated with the second operation group arriving at the NIC.

In a variation on this embodiment, if at least one packet associated with the first operation group is under processing in the NIC, the tracking logic block may refrain from notifying the host device that the memory segment can be released.

In a variation on this embodiment, a respective packet associated with the first operation group can correspond to an operation issued from a process running on a remote device. The memory segment can be allocated to the process.

In a variation on this embodiment, the tracking logic block can determine that the request for releasing the memory segment has been issued based on a command issued to the NIC via one of: a peripheral component interconnect express (PCIe) interface and a compute express link (CXL) interface.

Figure 2A:
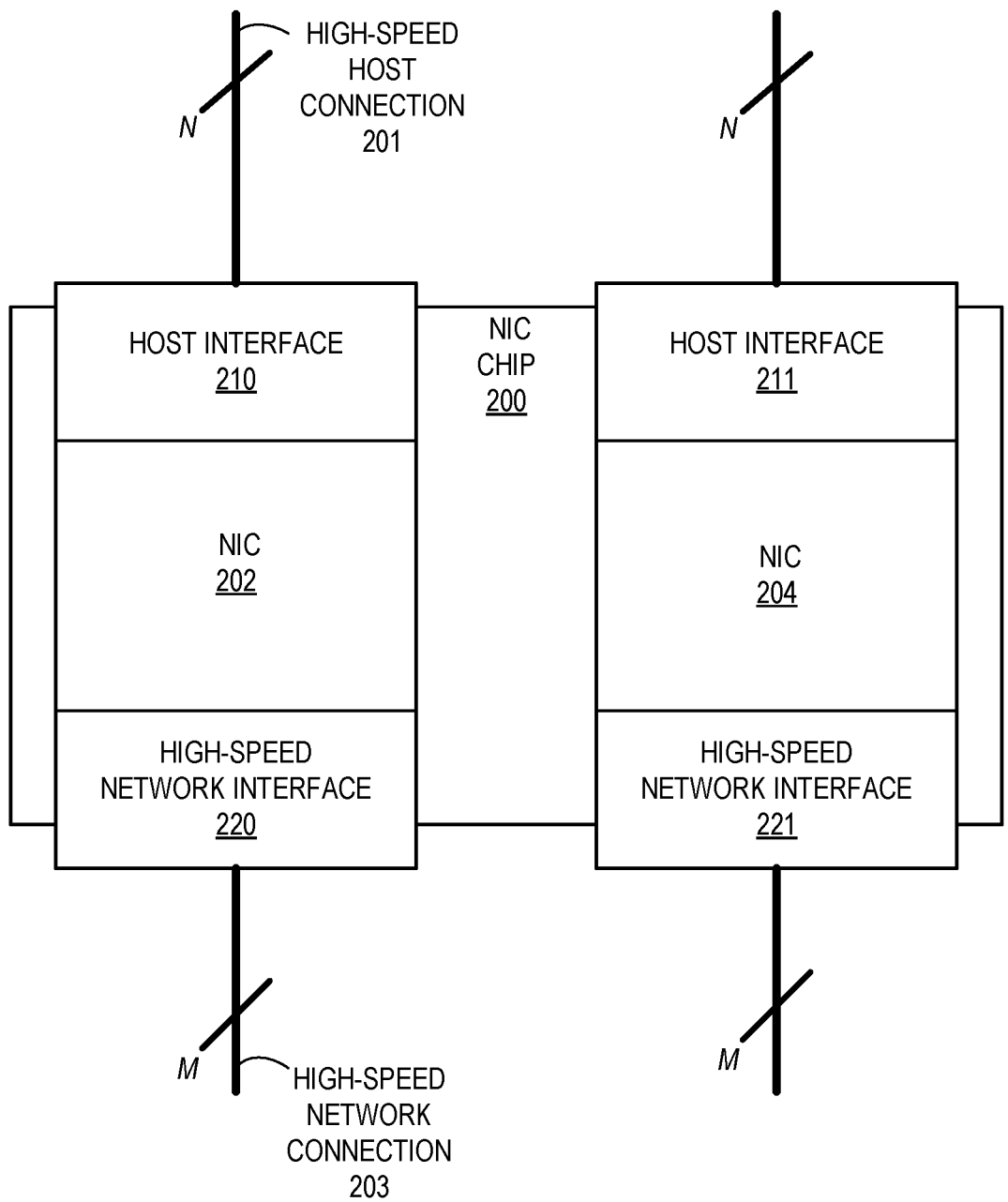
FIG. 2A shows an exemplary NIC chip with a plurality of NICs.

In this disclosure, the description in conjunction with FIG. 1 is associated with the network architecture and the description in conjunction with FIG. 2A and onward provide more details on the architecture and operations associated with a NIC that supports efficient management of idempotent operations.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniB and (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI), a peripheral component interconnect express (PCIe), or a compute express link (CXL) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
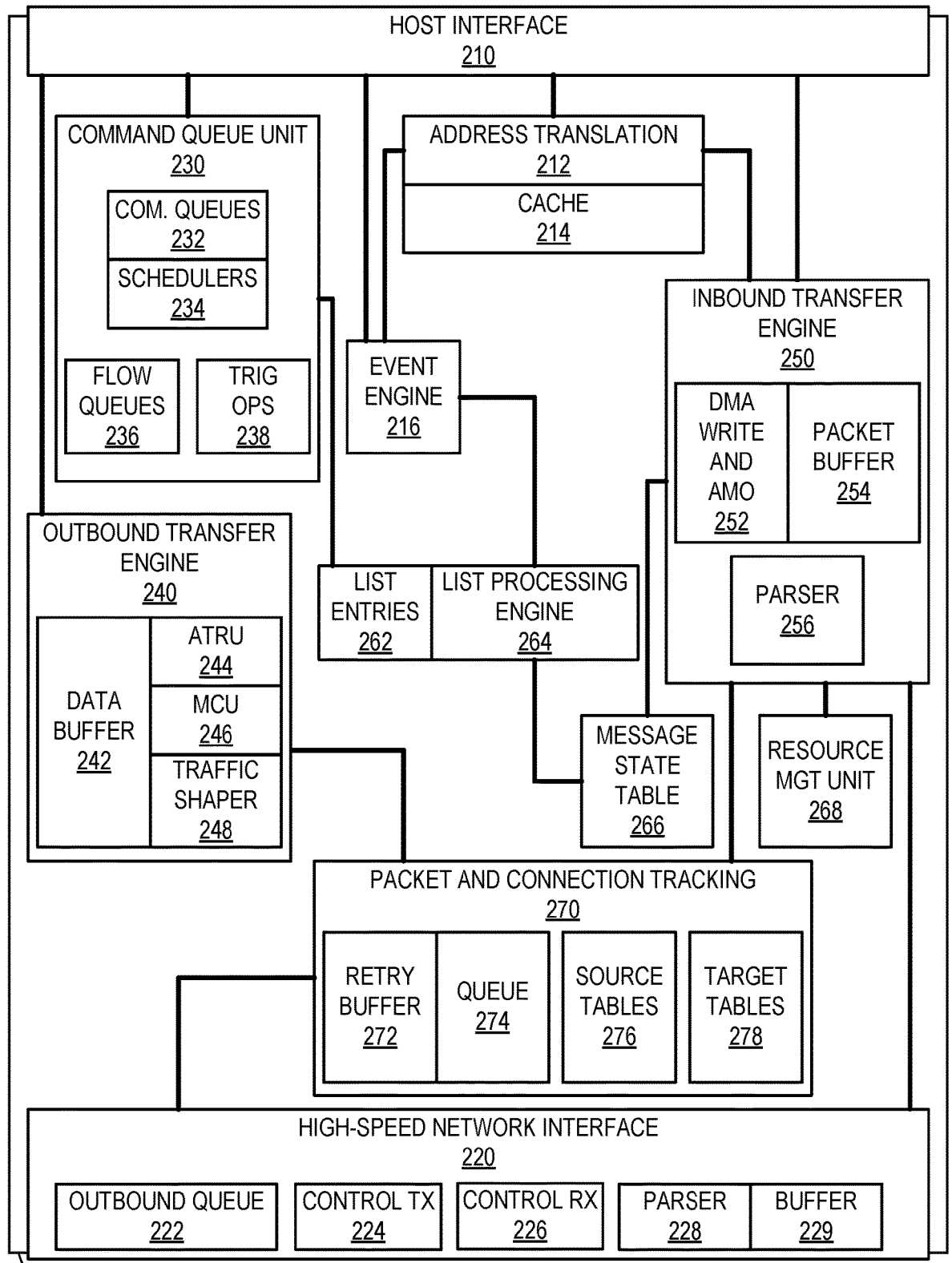
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a Command Queue (CQ) unit 230. CQ unit 230 can be responsible for fetching and issuing host side commands. CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE)

250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The received data can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be stored in retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a Message State Table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an EE 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

Efficient Memory Access from NIC

Figure 3A:
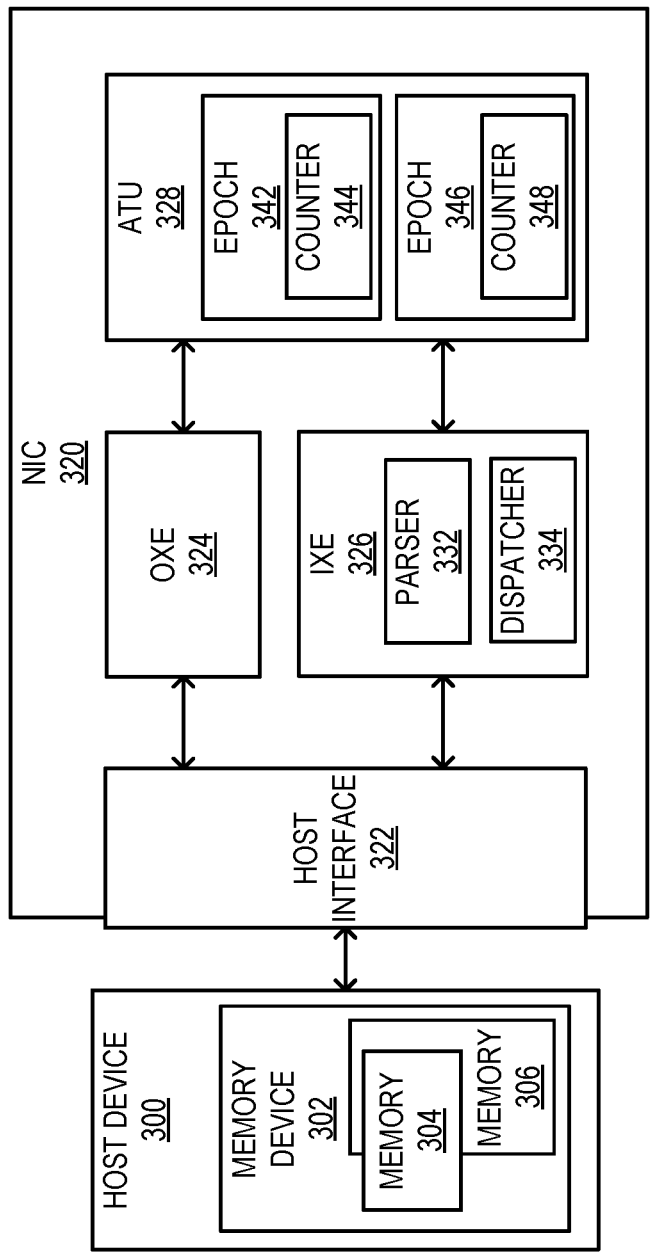
FIG. 3A shows an exemplary host memory access from a NIC.

FIG. 3A shows an exemplary packet injection into an output buffer in a NIC. In this example, host device 300 can include a NIC 320. A host interface 322 of NIC 320 may couple NIC 320 with device 300 and facilitate the communication between device 300 and NIC 320. Device 300 can include a memory device 302 (e.g., a dynamic random-access memory (DRAM) module). NIC 320 can include an OXE 324, an IXE 326, and an ATU 328. During operation, NIC 320 may process commands with operations that can access memory device 302 of device 300. The process issuing the commands can be allocated a memory segment 304 in memory device 302. The process may map the memory addresses of memory segment 304 to corresponding local memory addresses of the source device of the process.

Upon completion of its operations, the process may release the mapping. Consequently, the memory segment 304 can be released (or freed) from the process and can be reallocated to another process. However, for a distributed process, the release information may not be globally visible. As a result, some late operations that access memory segment 304 may still be issued. NIC 320, therefore, can have a number of packets in the processing pipeline when the process releases memory segment 304. The associated late operations may attempt to access memory segment 304 that may have been reassigned to another process.

To solve this problem, NIC 320 can protect memory segment 304 from the late operations by flushing the processing pipeline of NIC 320. NIC 320 can maintain two epochs 342 and 346. Epochs 342 and 346 can include counters 344 and 348, respectively. A respective epoch can be represented in NIC 320 based on an epoch identifier. For example, epochs 342 and 346 can be identified by a single bit in NIC 320. Accordingly, identifiers of epochs 342 and 346 can be 0 and 1, respectively. When memory segment 304 is allocated to the process, NIC 320 may receive a registration request for the mapping between the local memory addresses of the process and the memory addresses of memory segment 304.

Upon receiving the request, ATU 328 can activate epoch 342 for an operation group, which can be associated with the packets with operations that can access memory segment 304 while the corresponding memory mapping remains valid. The activation of epoch 342 can also be specific to the process. The activation of epoch 342 can include tagging subsequent packets with an identifier of epoch 342. Counter 344 can indicate a number of the packets of the operation group. When epoch 342 is activated, the epoch identifier can be distributed among the elements or units, such as OXE 324 and IXE 326, in NIC 320. Upon receiving a packet, NIC 320 can increment counter 344. On the other hand, when the packet leaves the packet processing pipeline, NIC 320 can decrement counter 344. As a result, counter 344 can indicate the number of packets of epoch 342 that are in the packet processing pipeline of NIC 320.

If the process requests to release memory segment 304, the process can provide the release information to NIC 320. In some embodiments, the release information can include a command, which can be issued by the process. The command may initiate a "wait" for the packets in the processing pipeline to flush. Upon receiving the release information, ATU 328 can switch (or toggle) epochs and activate epoch 346. As a result, epoch 346 can become the current epoch, and epoch 342 can become the previous epoch. All subsequent packets with memory access can then be tracked based on counter 348. However, the late packets, which are associated with the previous epoch and in the processing pipeline, can still be tracked based on counter 344. ATU 328 can continue to decrement counter 344 when a late packet associated with epoch 342 leaves the processing pipeline of NIC 320. When counter 344 becomes zero, ATU 328 can notify device 300 via HI 322 (e.g., based on a PCIe write) that the processing pipeline has been flushed.

Device 300 can then release memory segment 304. A portion of memory segment 304 (or in its entirety) can then be included in memory segment 306 allocated to another process. Counter 348 can then represent the packets issued from this other process. Since counter 348 has been incremented for the packets of the other process, ATU 328 can decrement counter 348 when a memory access operation is completed, and the associated packet leaves the processing pipeline. When the other process releases memory segment 306, ATU 328 can repeat the switchover process by switching to epoch 342. In this way, ATU 328 can toggle between epochs 342 and 346 to identify and track late packets in NIC 320, thereby facilitating the release of a memory segment when the pipeline is flushed.

IXE 326 can include a parser 332 and a dispatcher 334, as described in conjunction with FIG. 2B. When parser 332 receives information regarding epoch triggering of epoch 342 from ATU 328, parser 332 may store the information. As packets arrive at NIC 320, parser 332 can tag the packet with the identifier of epoch 342. The tag can remain associated with the packet while the packet traverses the processing pipeline of NIC 320. If parser 332 forwards the packet to another processing unit, such as an MST and an LPE, through the processing pipeline, parser 332 can send an epoch-specific increment signal (e.g., a signal specific to epoch 342) to ATU 328. Parser 332 may send the signal even if the packet experiences a failure. However, parser 332 may not send the signal if the packet is discarded.

Dispatcher 334 can identify epoch 342 based on the epoch identifier in the header of a packet received from other modules or units of NIC 320, such as MST and LPE. Dispatcher 344 can send an epoch-specific decrement signal to ATU 328 for a respective packet that may include a write operation for memory segment 304. Such an operation can include a PUT request if NIC 320 is a target NIC or a GET response if NIC 320 is a source NIC. Dispatcher 334 may send the signal even if the packet experiences a failure. Examples of an error can include an error detected by another unit or an operational error, such as an address translation error.

Dispatcher 334 may generate the decrement signal due to a read or a write operation. Dispatcher 334 can add the respective decrement signals associated with read and write operations to generate a combined decrement signal for ATU 328. OXE 324 can identify epoch 342 based on the epoch identifier in the header of a packet received from IXE 326. OXE 324 can send an epoch-specific decrement signal to ATU 328 for a respective packet that may include a read operation for memory segment 304. OXE 324 may send the signal even if the packet experiences a failure. In this way, ATU 328 can receive increment and decrement signals from OXE 324 and IXE 326, and adjust the values of counter 344 accordingly to track the packets of epoch 342.

Figure 3B:
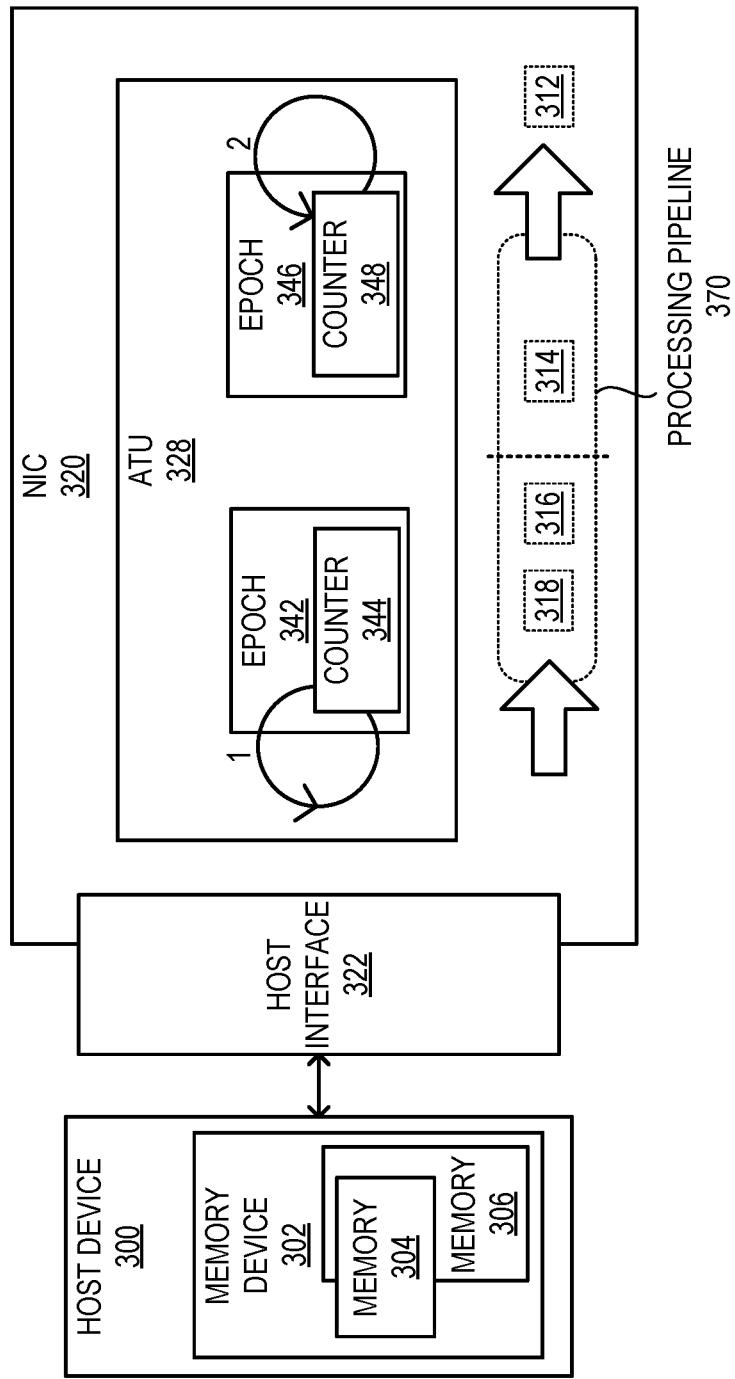
FIG. 3B shows an exemplary epoch management in a NIC for facilitating efficient host memory access.

FIG. 3B shows an exemplary epoch management in a NIC for facilitating efficient host memory access. Suppose that packets 312 and 314 associated with epoch 342 arrive at NIC 320 and enters processing pipeline 370. Accordingly, ATU 328 can increment counter 344 to a value of 2. Subsequently, based on an instruction, ATU 328 may toggle epochs and activate epoch 346. When NIC 320 receives packets 316 and 318, ATU 328 can increment counter 348 to a value of 2 (denoted with a dashed line). When packet 312 leaves processing pipeline 370. Consequently, ATU 328 can decrement counter 344 to a value of 1. ATU 328 can continue this process until counter 344 becomes zero. ATU 328 can then notify host device 300 that the late packets have been flushed from processing pipeline 370, and memory segment 304 can be released.

Figure 4A:
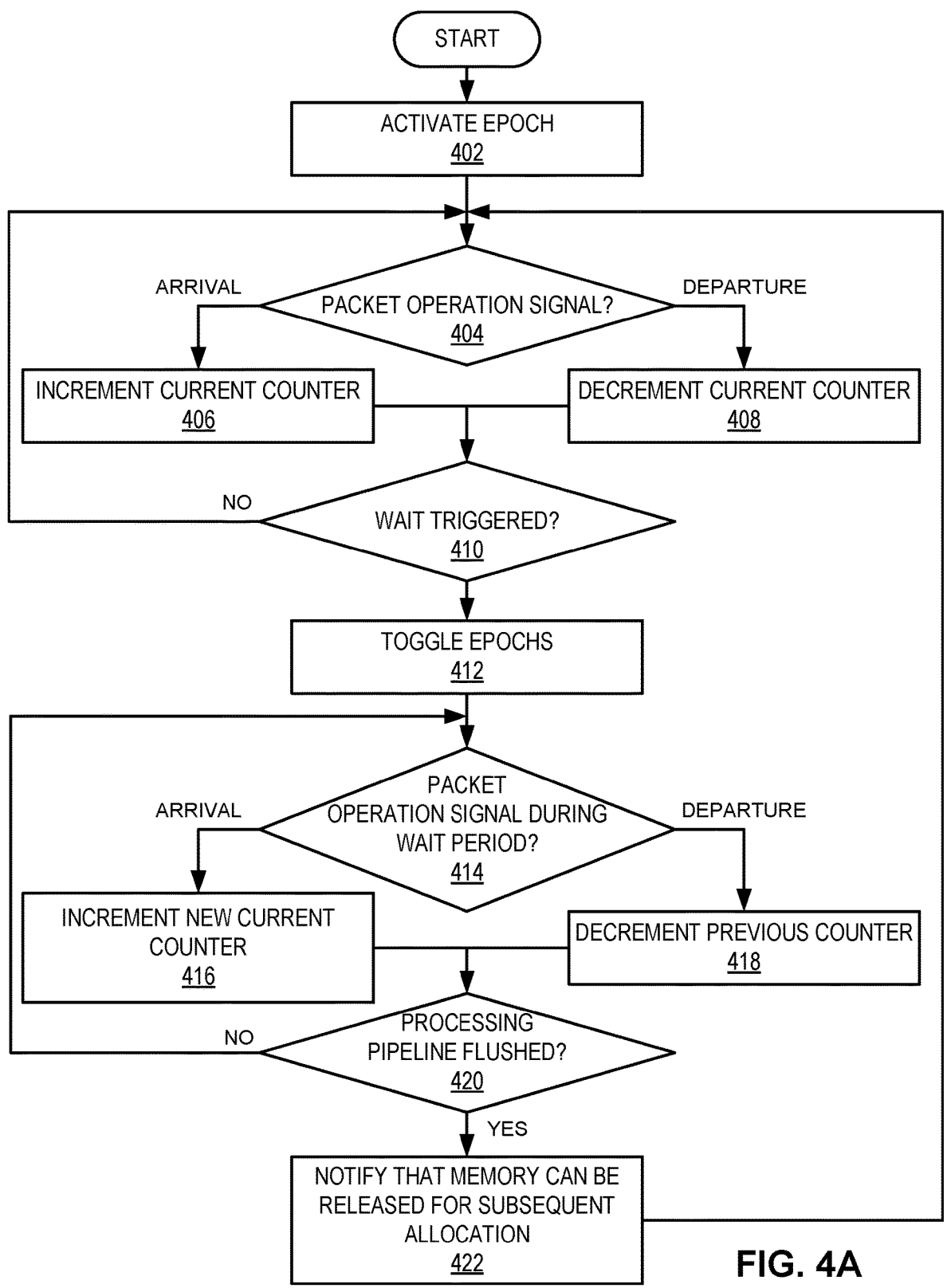
FIG. 4A shows a flow chart of an epoch management process in a NIC for facilitating efficient host memory access.

FIG. 4A shows a flow chart of an epoch management process in a NIC for facilitating efficient host memory access. During operation, the NIC can activate an epoch (operation 402). The NIC can then determine a packet operation signal (operation 404). If the signal is for the arrival of an operation or a packet corresponding to the operation, the NIC can increment a current counter (i.e., associated with the activated epoch) (operation 406). On the other hand, if the signal is for a departure, the NIC can decrement the current counter (operation 408).

Subsequently, the NIC can determine whether a wait has been triggered (operation 410). If the wait has not been triggered, the NIC can continue to determine packet operation signals (operation 404). If the wait has been triggered, the NIC can toggle the epochs (operation 412). The toggling can cause the current epoch to become a previous epoch and the other epoch to become the new current epoch. The NIC can then determine the packet operation signal during the wait period (operation 414). If the signal is for an arrival, the NIC can increment the new current counter (i.e., associated with the newly activated epoch) (operation 416).

On the other hand, if the signal is for a departure, the NIC can decrement the previous counter (operation 418). Subsequently, the NIC can determine whether the processing pipeline has been flushed (i.e., the value of the previous counter has become zero) (operation 420). If the processing pipeline is not flushed, the NIC can continue to determine packet operation signals during the wait period (operation 414). On the other hand, if the processing pipeline is flushed, the NIC can notify the host device that the memory segment can be released for a subsequent allocation (operation 422). The NIC can continue to determine packet operation signals (operation 404).

Figure 4B:
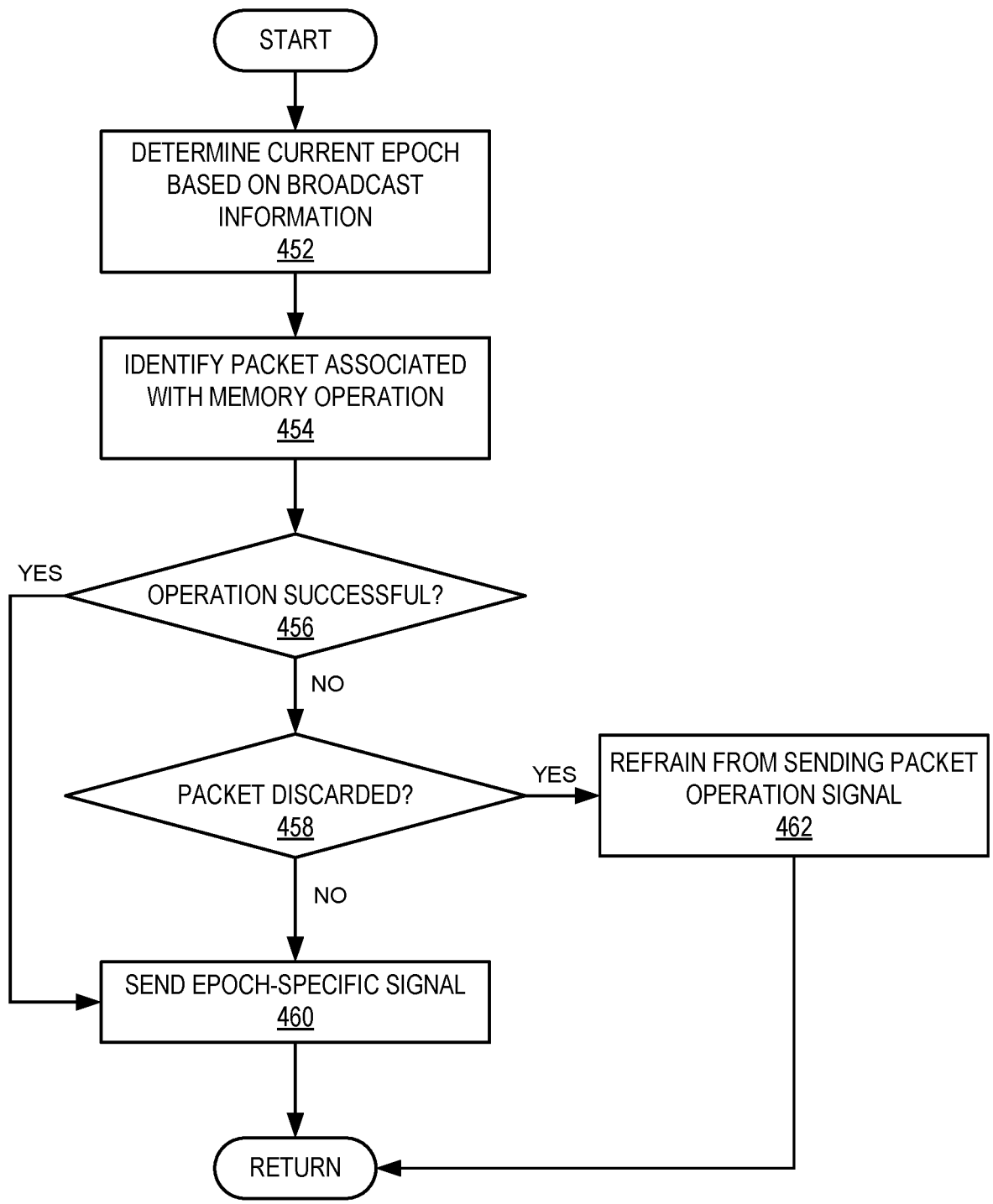
FIG. 4B shows a flow chart of a notification process for epoch management in a NIC.

FIG. 4B shows a flow chart of a notification process for epoch management in a NIC. During operation, an operation unit (e.g., an OXE or an IXE) of the NIC can determine the current epoch based on broadcast information (operation 452) and identify a packet associated with a memory operation (e.g., a read or a write) (operation 454). The unit can then determine whether the operation is successful (operation 456). If the operation is not successful, the unit may determine whether the packet is discarded (operation 458). If the operation is successful (operation 456) or the packet is not discarded (operation 458), the unit can send an epoch-specific signal based (operation 460). The signal can indicate whether to increment or decrement the epoch counter, as described in conjunction with FIG. 3A. If the packet is discarded (operation 458), the unit may refrain from sending a signal (operation 462).

Exemplary Computer System

Figure 5:
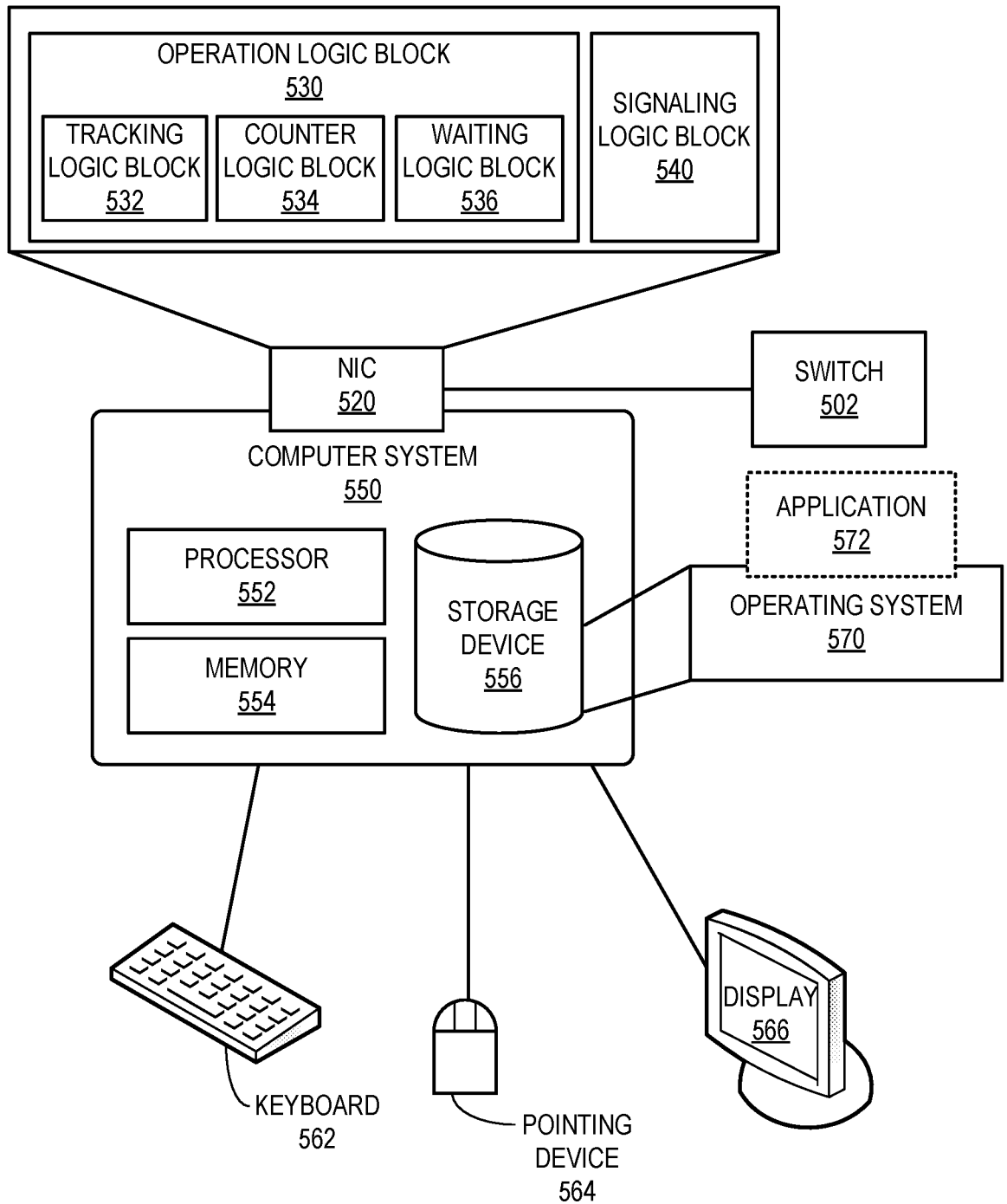
FIG. 5 shows an exemplary computer system equipped with a NIC that facilitates efficient host memory access.

FIG. 5 shows an exemplary computer system equipped with a NIC that facilitates efficient packet forwarding. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates efficient data request management. NIC 520 can provide one or more HNIs to computer system 550. NIC 520 can be coupled to a switch 502 via one of the HNIs. NIC 520 can include an operation logic block 530 (e.g., in an ATU of NIC 520) and a signaling logic block 540 (e.g., in an OXE or IXE of NIC 520). Operation logic block 530 can maintain epochs or operation groups for NIC 520, and may include a tracking logic block 532, a counter logic block 534, and a waiting logic block 536.

Signaling logic block 540 can send a signal to operation logic block 530, indicating the arrival or departure of a packet from the processing pipeline of NIC 520. Tacking logic block 532 can track the packets associated with an epoch in a packet processing pipeline. Counter logic block 534 can increment or decrement a counter based on a signal from signaling logic block 540. Waiting logic block 536 can determine that a wait instruction has been triggered. Accordingly, waiting logic block 536 can toggle the epochs of NIC 520. Counter logic block 534 can then increment the counter of the new epoch and decrement the counter of the previous epoch based on the signal from signaling logic block 540. When the counter of the previous epoch becomes zero, tacking logic block 532 can notify computer system 550 that the processing pipeline has been flushed.

In summary, the present disclosure describes a NIC that facilitates efficient memory access from the NIC. The NIC can be equipped with an operation logic block, a signaling logic block, and a tracking logic block. The operation logic block can maintain a first operation group associated with packets requesting an operation on a memory segment of a host device of the NIC. The signaling logic block can determine whether a packet associated with the first operation group has arrived at or departed from the NIC. Furthermore, the tracking logic block can determine that a request for releasing the memory segment has been issued. The tracking logic block can then determine whether at least one packet associated with the first operation group is under processing in the NIC. If no packet associated with the first operation group is under processing in the NIC, tracking logic block can notify the host device that the memory segment can be released.

The methods and processes described above can be performed by hardware logic blocks, modules, logic blocks, or apparatus. The hardware logic blocks, modules, logic blocks, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   activating a first operation group for packets requesting access to a memory segment;
   incrementing or decrementing a first counter for the first operation group in response to receiving or transmitting a packet associated with the first operation group; and
   in response to detecting a command to release the memory segment:
      activating a second operation group for packets requesting access to the memory segment;
      incrementing a second counter for the second operation group in response to receiving a packet associated with the second operation group;
      preventing, in response to the first counter not being zero, packets or operations associated with the second operation group from accessing the memory segment;
      flushing remaining packets in a pipeline associated with the first operation group by decrementing the first counter responsive to transmitting a respective remaining packet until all the remaining packets are transmitted and the first counter reaches zero; and
      releasing the memory segment in response to the first counter reaching zero.

2. The method of claim 1, further comprising:
   in response to releasing the memory segment, allowing operations associated with the second operation group to access the memory segment.

3. The method of claim 1, wherein in response to detecting the command to release the memory segment, the method further comprises:
   deactivating the first operation group; and
   initiating a waiting period during which the remaining packets in the pipeline associated with the first operation group are to be flushed.

4. The method of claim 3, further comprising:
   preventing, during the waiting period, the packets or operations associated with the second operation group from accessing the memory segment.

5. The method of claim 1,
   wherein activating the first operation group comprises tagging packets associated with the first operation group with a first identifier, and
   wherein activating the second operation group comprises tagging packets associated with the second operation group with a second identifier.

6. The method of claim 5, further comprising:
   identifying, based on the first identifier or the second identifier, packets which request access to the memory segment subsequent to detecting the command; and
   tracking the identified packets by toggling between activating one of the first operation group and the second operation group, thereby facilitating releasing the memory segment in response to flushing a pipeline associated with the activated first or second operation group.

7. The method of claim 1, wherein incrementing or decrementing the first counter is further in response to:
   detecting an initiation or a completion of an operation on the memory segment, wherein the operation is indicated in the received or transmitted packet associated with the first operation group; and
   generating a signal based on the detected initiation or completion.

8. A network interface controller (NIC) comprising circuitry to:

activate a first operation group for packets requesting access to a memory segment in a host device associated with the NIC;
increment a first counter for the first operation group in response to receiving a packet associated with the first operation group;
decrement the first counter for the first operation group in response to transmitting a packet associated with the first operation group;
activate a second operation group for packets requesting access to the memory segment in response to detecting a command to release the memory segment;
increment a second counter for the second operation group in response to receiving a packet associated with the second operation group;
prevent, in response to the first counter not being zero, packets or operations associated with the second operation group from accessing the memory segment;
flush remaining packets in a pipeline associated with the first operation group by decrementing the first counter responsive to transmitting a respective remaining packet until all the remaining packets are transmitted and the first counter reaches zero; and
release the memory segment in response to the first counter reaching zero.

9. The network interface controller of claim 8, the circuitry further to:
allow operations associated with the second operation group to access the memory segment responsive to releasing the memory segment.

10. The network interface controller of claim 8, the circuitry further to:
release the memory segment by notifying the host device to release the memory segment.

11. The network interface controller of claim 8, the circuitry further to:
responsive to detecting the command to release the memory segment, deactivate the first operation group and initiate a waiting period which allows the remaining packets in the pipeline associated with the first operation group to be flushed.

12. The network interface controller of claim 11, the circuitry further to:
block the packets or operations associated with the second operation group from accessing the memory segment after the waiting period is initiated.

13. The network interface controller of claim 8, the circuitry further to:
tag packets associated with the first operation group with a first identifier in response to activating the first operation group; and
tag packets associated with the second operation group with a second identifier in response to activating the second operation group.

14. The network interface controller of claim 13, the circuitry further to:
identify, based on the first identifier, packets which request access to the memory segment subsequent to detecting the command; and
track the identified packets in the NIC by switching from the first operation group to the second operation group, thereby allowing the release of the memory segment in response to flushing the pipeline associated with the activated first operation group.

15. The network interface controller of claim 8, the circuitry further to:

in response to detecting another command to release the memory segment while the second operation group is activated:
activate the first operation group;
increment the first counter for the first operation group in response to receiving a packet associated with the first operation group;
decrement the second counter for the second operation group in response to transmitting a packet associated with the second operation group; and
release the memory segment in response to the second counter reaching zero,
thereby toggling between the first operation group and the second operation group and releasing the memory segment based on tracking the first counter and the second counter.

16. The network interface controller of claim 8, the circuitry further to:
detect an initiation or a completion of an operation on the memory segment, wherein the operation is indicated in the received or transmitted packet associated with the first operation group; and
generate a signal based on the detected initiation or completion.

17. A computer system comprising:
a processor; and
an apparatus storing instructions to:
register, based on a request, a mapping between local addresses and a memory segment to be allocated to a process;
activate a first operation group for packets requesting access to the memory segment in response to registering the mapping;
increment or decrement a first counter for the first operation group in response to receiving or transmitting a packet associated with the first operation group; and
in response to detecting a command to release the memory segment:
activate a second operation group for packets requesting access to the memory segment;
prevent, in response to the first counter not being zero, packets or operations associated with the second operation group from accessing the memory segment;
flushing remaining packets in a pipeline associated with the first operation group by decrementing the first counter responsive to transmitting a respective remaining packet until all the remaining packets are transmitted and the first counter reaches zero; and
release the memory segment in response to the first counter reaching zero.

18. The computer system of claim 17, the instructions further to:
in response to detecting the command to release the memory segment, decrement the first counter for the first operation group in response to transmitting a packet associated with the first operation group;
subsequent to releasing the memory segment, allow access to the memory segment by the operations associated with the second operation group;
increment a second counter for the second operation group in response to receiving a packet associated with the second operation group; and decrement the second counter for the second operation group in response to transmitting a packet associated with the second operation group.

19. The computer system of claim 17, the instructions further to:
   responsive to detecting the command to release the memory segment:
      deactivate the first operation group;
      initiate a waiting period during which the remaining packets in the pipeline associated with the first operation group are to be flushed;
      block the packets or operations associated with the second operation group from accessing the memory segment during the waiting period; and
      responsive to the waiting period ending, allow the packets or operations associated with the second operation group to access the memory segment.

20. The computer system of claim 17, the instructions further to:
   tag packets associated with the first operation group with a first identifier in response to activating the first operation group;
   tag packets associated with the second operation group with a second identifier in response to activating the second operation group;
   identify, based on the first identifier or the second identifier, packets which request access to the memory segment subsequent to detecting the command; and
   track the identified packets by toggling between activating one of the first operation group and the second operation group, thereby facilitating the release of the memory segment in response to flushing a pipeline associated with the activated first or second operation group.

* * * * *